United States Patent Office 3,234,081
Patented Feb. 8, 1966

---

3,234,081
INSECT REPELLENTS MANUFACTURED FROM DETERGENT ALKYLATE
Samuel B. Baker and William R. Thompson, Sarnia, Ontario, Canada, assignors to Esso Research and Engineering Company, a corporation of Delaware
No Drawing. Filed Sept. 24, 1962, Ser. No. 225,886
5 Claims. (Cl. 167—30)

The present invention is concerned with a new chemical compound which is particularly effective as an insect repellent. The invention more specifically is concerned with an amido derivative which may be used alone as a very effective insect repellent but is particularly adapted to be used in conjunction with various balms, petroleum white oil sprays, vaselines, wax emulsions, and other carriers.

It is well known in the art to prepare various insect repellents for the protection of humans and animals against annoying and poisonous insect bits. These insect repellents are also used either alone or in conjunction with various balms, creams or other carriers. The present invention is particularly concerned with the manufacture of a very effective insect repellent which comprises an amido derivative prepared from an alkylated benzene. The alkylated benzene is prepared with a $C_{12}H_{25}$ branched chain olefin from a petroleum hydrocarbon product. This product is prepared by the polymerization of propylene, obtained from a petroleum refinery operation. The polymerization is carried out in the presence of $H_3PO_4$ catalyst and yields a product containing branched chain olefins from $C_6$ to $C_{18}$. The desired fraction, separated by distillation, boils in the range 370–460° F. It is a highly branched, predominantly type 5 olefin containing a preponderance of $C_{12}$. The type 5 olefin is classified according to the Boord classification described by Schmidt and Boord, J.A.C.S., vol. 54, page 751, 1932. This fraction is referred to in the trade as tetrapropylene or "tetramer." It is used to alkylate benzene for the production of dodecyl benzene, referred to in the trade as "detergent alkylate."

The derivative of the present invention is prepared from dodecyl benzene, i.e. "detergent alkylate."

The tetramer of propylene, a $C_{12}$ branched chain olefin boiling between 370–460° F., is reacted with an excess of benzene as, for example, 1 volume of tetramer/5 volumes of benzene, at 50° F. and atmospheric pressure in the presence of the Friedel-Crafts catalyst, aluminum trichloride. The $AlCl_3$ is approximately 2 to 3 mol percent of the reaction mixture and is activated by the injection of gaseous, anhydrous, hydrogen chloride added at the rate of about 0.1 mole percent. The product of this reaction is fractionated by distillation and the desired product is separated in the boiling range 530–620° F. It contains an average side chain carbon number in the range from about 11.9 to 12.5 preferably of 12.2 and constitutes about 75% of the reaction product.

The method of preparation of the amido derivative of the present invention from the alkylated benzene involves the following reactions:

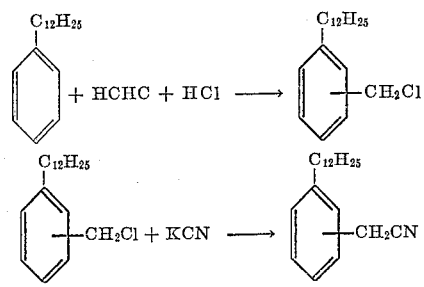

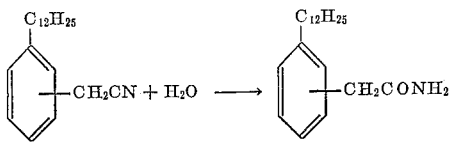

A specific example of the chloromethylation reaction: dodecyl benzene (24.6 g.), concentrated hydrochloric acid (160 ml.), 27% formalin solution (35 g.) and zinc chloride (30 g.) were mixed and stirred in a 500 ml. 3-necked flask equipped with a stirrer and reflux condenser. The mixture was heated for 10 hours at 80° C. then cooled to ambient temperature. The organic layer was separated and washed well with water and aqueous sodium bicarbonate solution, then dried over anhydrous sodium sulfate.

The dried oil was distilled and, after a small forerun, the main fraction boiling point 230–240° C./20 mm. was collected. This material was chloromethyl dodecyl benzene. The chloromethyl derivatives can also be prepared by means of chloromethylmethyl ether, carbon disulfide and stannic chloride in nonaqueous solution.

The crude, bright yellow product weighed 29.5 g., which corresponded to 120 wt. percent or 99% of stoichiometry, based on Escane 248 (a detergent alkylate having an average molecular weight of 248) added. The product on distillation at 195–205° C./17 mm. gave 29.0 g. of a light yellow material.

*Analysis.*—Calcd. for $C_{19}H_{31}Cl$:Cl, 12.2%. Found Cl, 11.9%.

The purity was 97.5% based on chlorine content.

The chloromethyl compound was then converted to the cyanomethyl derivative by the following reaction:

In a round bottom 3-neck flask equipped with a reflux condenser, stirrer and dropping funnel were placed potassium cyanide (8 g.) and water (10 ml.). The mixture was warmed to dissolve the cyanide. The chloromethyl dodecyl benzene derivative (25 g.), dissolved in ethanol (30 ml.), was added during 0.5 hour. The mixture was heated with stirring an additional 4 hours. Then, after cooling, the separated potassium chloride was removed by filtration and the filter was washed with a small volume of ethanol. The combined filtrates were distilled in vacuum to remove ethanol and water, after which the dark residual oil was distilled at 260–270° C./20 mm. Sodium cyanide may be used in place of potassium cyanide.

The cyanomethyl derivative was partially hydrolyzed by heating for 3 hours at 100° C. with concentrated hydrochloric acid. The amide thus formed (dodecylphenyl acetamide) is a very active and effective agent of the present invention.

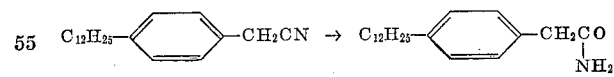

Other satisfactory compounds are those wherein the hydrogen attached to the nitrogen is substituted with an alkyl group, preferably those alkyl groups containing from about 1 to 4 carbon atoms. A particularly effective compound comprises N,N-diethyl dodecylphenylacetamide. Other satisfactory compounds are those wherein, for example, one hydrogen attached to the nitrogen is replaced with a methyl group or with a propyl alkyl group. These N-substituted methyl and ethyl compounds were prepared as follows:

*Preparation of N,N-diethyl dodecylphenylacetamide*

A new batch of the cyanomethyl derivative, discussed above, was completely hydrolyzed to dodecylphenyl acetic acid by the standard method.

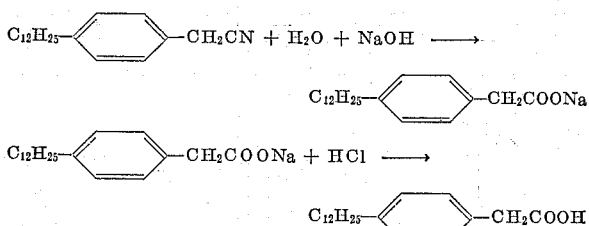

$$C_{12}H_{25}\text{—}\langle\text{—}\rangle\text{—}CH_2CN + H_2O + NaOH \longrightarrow$$

$$C_{12}H_{25}\text{—}\langle\text{—}\rangle\text{—}CH_2COONa$$

$$C_{12}H_{25}\text{—}\langle\text{—}\rangle\text{—}CH_2COONa + HCl \longrightarrow$$

$$C_{12}H_{25}\text{—}\langle\text{—}\rangle\text{—}CH_2COOH$$

The acid thus formed was dissolved in benzene to make a 40 wt. percent solution. This solution was refluxed for two hours with a slight excess of thionyl chloride (any compound known to be a chlorinating agent would do) to convert the acid to the acyl halide.

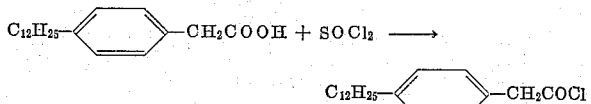

$$C_{12}H_{25}\text{—}\langle\text{—}\rangle\text{—}CH_2COOH + SOCl_2 \longrightarrow$$

$$C_{12}H_{25}\text{—}\langle\text{—}\rangle\text{—}CH_2COCl$$

The reaction mixture was evaporated to dryness, and traces of $SOCl_2$ removed by several co-distillations with benzene. The product was made up to a 40 wt. percent solution in benzene and the solution then added dropwise to a cold (0° C.), stirred, 20 wt. percent solution of diethylamine in benzene during one-half hour. Stirring was continued for an additional one hour.

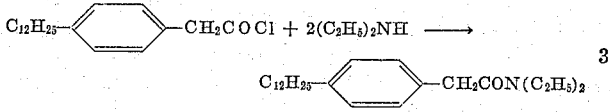

$$C_{12}H_{25}\text{—}\langle\text{—}\rangle\text{—}CH_2COCl + 2(C_2H_5)_2NH \longrightarrow$$

$$C_{12}H_{25}\text{—}\langle\text{—}\rangle\text{—}CH_2CON(C_2H_5)_2$$

N,N-diethyl dodecylphenylacetamide

The reaction mixture was washed thoroughly with water to remove water soluble salts and excess amine, dried over anhydrous $Na_2SO_4$ and the benzene removed by vacuum distillation. The product was a viscous, amber, oil.

Thus, the compounds of the present invention have the following generic formula:

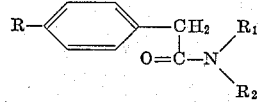

wherein R represents an alkyl radical having from about $C_6$ to $C_{18}$ carbon atoms wherein $C_{12}$ is at least 50%; and wherein $R_1$ and $R_2$ represent hydrogen and/or an alkyl group containing from about 1 to 5 carbon atoms in the radical.

As pointed out heretofore, this amide derivative may be used as such as an insect repellent, but is preferably used with a carrier.

A specific desirable oil carrier to be used in conjunction with the amido derivative of the present invention is a white oil. A typical white oil carrier of the present invention is a white oil having a specific gravity in the range from about .86 to .89, preferably in the range of from about .88 to .89, and of a color of at least 10. The viscosity is in the range of about 355 to 375 S.S.U. at 100° F. as, for example, 365 S.S.U. The pour is less than 0 as, for example, in the range of about −15° F. to about −50° F. The oil passes the U.S.P. acid test (ASTM D–565–45) as, for example, about 2.5.

Other characteristics of a specific typical carrier oil of the present invention are as follows:

| | Percent | Range percent |
|---|---|---|
| Aromatics | 0 | 0–5 |
| Paraffins | 8 | 6–12 |
| One Ring Non-condensible Naphthenes | 26 | 20–30 |
| Two Ring Non-condensible Naphthenes | 24 | 20–30 |
| Three Ring Non-condensible Naphthenes | 19 | 15–25 |
| Four Ring Non-condensible Naphthenes | 13 | 10–16 |
| Five Ring Non-condensible Naphthenes | 6 | 4–10 |
| Six Ring Non-condensible Naphthenes | 4 | 2–6 |

TYPICAL BOILING RANGE (CALCULATED FROM 10 MM. DISTILLATION)

| | ° F. | Range, ° F. |
|---|---|---|
| Initial | 740 | 700–760 |
| 50% | 883 | 860–900 |
| 90% | 935 | 900–960 |
| Final | 975 | 960–990 |

The hydrocarbon emulsion carrier, such as wax emulsion and asphalt emulsion may be prepared by methods known in the art. Generally these wax and asphalt emulsions are wax in water emulsions wherein the amount of wax or asphalt present is in the range from about 20 to 65 percent by weight.

The amount of amido derivative used in conjunction with white oils, balms, wax emulsions, or other carriers may vary appreciably. However, the amount used by weight is in the range from about .05% to about 40 wt. percent preferably about 10 to 15 wt. percent.

A reagent composition prepared as hereinbefore described was tested as shown by the following examples. In a test, the reagent of the present invention was applied to the arms and legs of a number of individuals. The remaining individuals did not apply the reagent. After an elapsed period of about an hour, the individuals having the reagent of the present invention received no mosquito and gnat bites, while the remaining individuals had received innumerable mosquito and gnat bites. A second test was conducted approximately two months later, and the results were substantially those observed in Test 1.

What is claimed is:

1. An insect repellent composition comprising a major amount of a carrier and about 0.05 to about 40 wt. percent of an amido detergent alkylate having the formula:

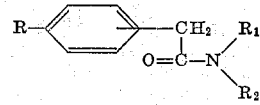

where R is a $C_6$ to $C_{18}$ hydrocarbon alkyl and wherein $R_1$ and $R_2$ are selected from the group consisting of hydrogen and $C_1$ to $C_5$ alkyls.

2. A composition as defined by claim 1 wherein said carrier is a white oil.

3. A composition as defined by claim 1 wherein said carrier is a wax in water emulsion.

4. An insect repellent composition comprising a major amount of white oil and about 0.05 to about 40 wt. percent of an amido alkylated benzene having the formula:

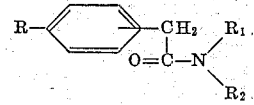

where R is a $C_6$ to $C_{18}$ branched hydrocarbon alkyl and wherein $R_1$ and $R_2$ are selected from the group consisting of hydrogen and $C_1$ to $C_5$ alkyls.

5. An insect repellent composition comprising a major amount of a carrier and about 0.05 to about 40 wt. percent dodecylphenyl acetamide.

References Cited by the Examiner

UNITED STATES PATENTS

| 2,166,120 | 7/1939 | Bousquet | 167—22 |
| 2,408,389 | 10/1946 | Gertler | 167—13 |
| 2,724,677 | 11/1955 | McCabe | 167—13 |
| 2,872,367 | 2/1959 | Haynes et al. | 167—30 |
| 2,874,188 | 2/1959 | Micucci et al. | 260—558 |
| 2,883,320 | 4/1959 | Nickell | 167—30 |
| 3,022,302 | 2/1962 | Martensson | 260—247.7 |
| 3,057,919 | 10/1962 | Pursglove | 260—558 |
| 3,073,862 | 1/1963 | Abramo et al. | 260—558 |

JULIAN S. LEVITT, *Primary Examiner.*

LEWIS GOTTS, *Examiner.*